Oct. 3, 1961 P. BRADFORD 3,002,730
AIR CONDITIONING SYSTEM
Filed Oct. 3, 1956
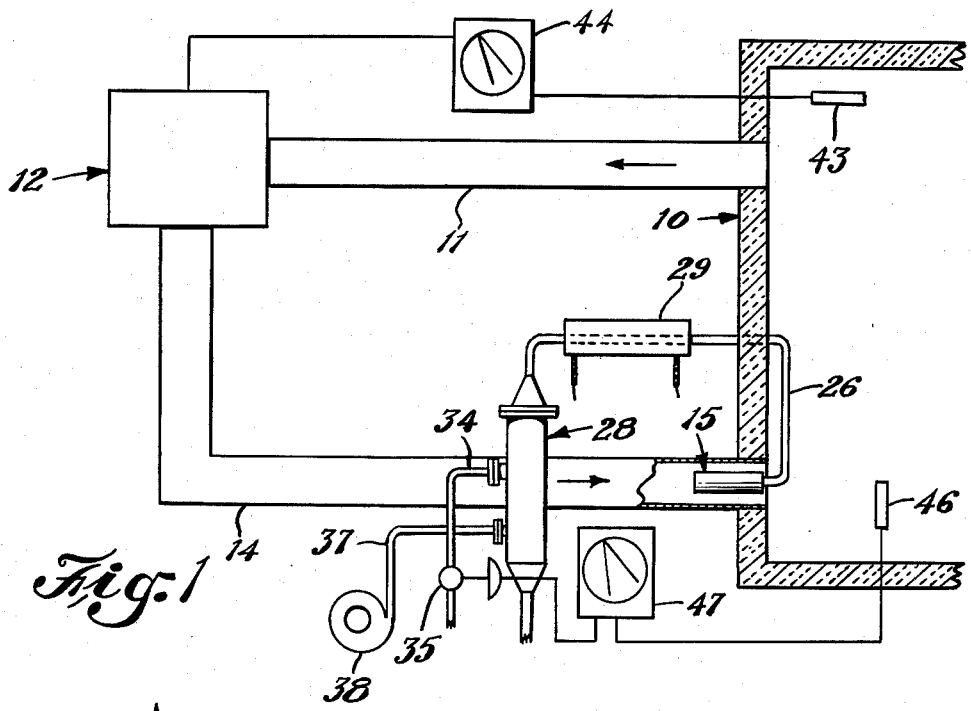
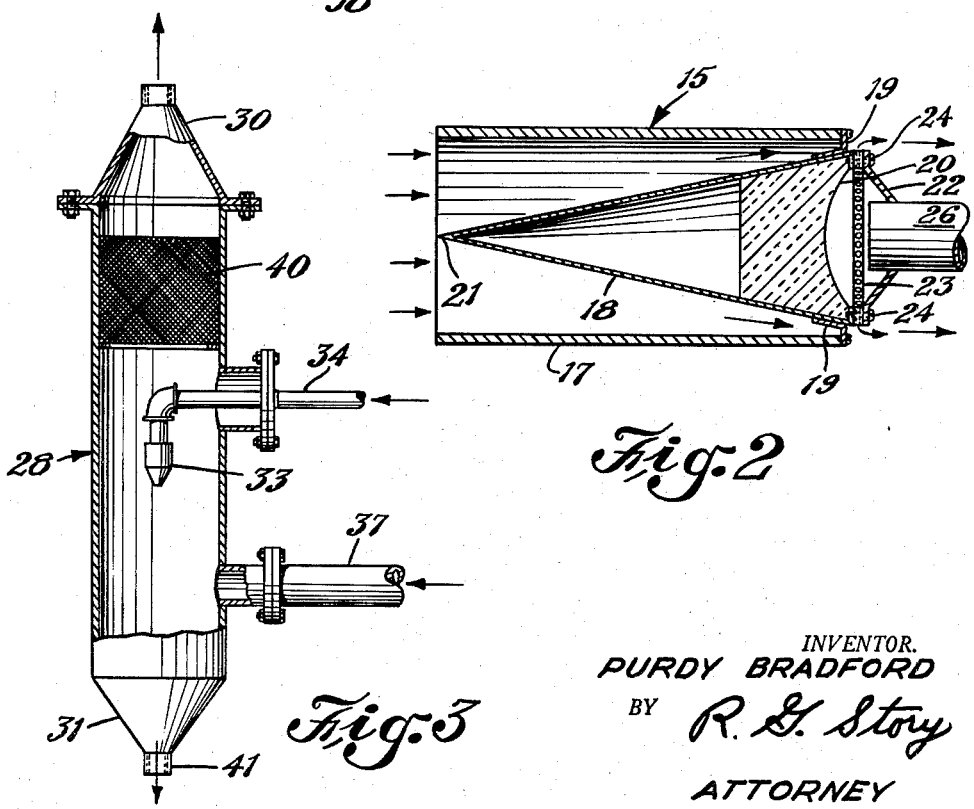
INVENTOR.
PURDY BRADFORD
BY R. G. Story
ATTORNEY United States Patent Office 3,002,730
Patented Oct. 3, 1961

3,002,730
AIR CONDITIONING SYSTEM
Purdy Bradford, Palos Park, Ill., assignor to Swift & Company, Chicago, Ill., a corporation of Illinois
Filed Oct. 3, 1956, Ser. No. 613,699
4 Claims. (Cl. 257—280)

This invention relates to atmospheric conditioning and provides an improved apparatus. The invention permits close regulation of both humidity and temperature. The system, while not limited thereto, is particularly useful in the refrigeration of meats and other foodstuffs.

In many food industries shrinkage is a serious problem. For instance, in the meat packing industry, shrinks in the neighborhood of 2 percent are common and result in large monetary losses. There are methods of meat processing which require close regulation of both temperature and humidity. Excessive moisture loss from carcass meat impairs color or bloom.

Various methods and apparatus have been used to provide regulation of humidity and temperature. While effective temperature control has been generally had without too much difficulty, it has been generally experienced that control of the humidity within narrow limits is much more difficult. Through the use of the equipment of the present invention, I am able to effectively regulate humidity within critical limits, as well as temperature. The practice of the invention substantially reduces meat shrinkage and facilitates the practice of other methods of meat processing.

In its broad aspect, my invention comprises introducing into a stream of cooled air, subsequent to its refrigeration and prior to its return to the refrigerated chamber, a stream of air having a moisture load of a magnitude sufficient upon mixing with the cooled air to provide the relative humidity desired in the refrigerated chamber. The moisture content of the introduced air stream is regulated as a function of the relative humidity of the chamber. If the relative humidity of the chamber is at a level less than the predetermined value, the moisture load of the introduced air is increased. To the converse, if the relative humidity of the conditioned space becomes excessive, the moisture load of the introduced air is decreased an amount sufficient to restore the desired relative humidity within the chamber. The air of the introduced stream is saturated by the addition of steam, and the amount of steam added at any moment is a function of the relative humidity of the chamber. Since the air is always saturated or substantially saturated (at the point of introduction of the steam) with moisture, an increase in the amount of steam will raise the temperature of that air with the result there is an increase in its moisture load.

It has been my experience that the cooled air and the introduced air must be intimately mixed before distribution throughout the cooled chamber. It has been heretofore suggested and actually tried, to regulate relative humidities by injecting steam directly into the atmosphere of a cooled space. It has not been possible with this approach to have effective control of relative humidity nor to provide a fairly constant relative humidity throughout the air of the refrigerated space.

The air conditioning system of my invention is made up of a conditioned chamber, a conditioning unit and suitable ducts for removing air from the chamber to the unit and for returning the conditioned air from the unit to the chamber. Means are provided for introducing a moisture-laden stream of air into the return duct with means for intimately mixing the introduced air and the cooled air. The system has means for regulating the moisture content of the moisture-laden air as a function of the relative humidity of the conditioned chamber. Normally, means will be provided for regulating the temperature of the air within the conditioning unit as a function of the temperature of the chamber.

I prefer to intimately mix the two aforementioned streams of air by a mixing apparatus of my own design. The apparatus has a cylindrical sleeve with a cross-section smaller than the return duct and is disposed within this duct. A cone is placed within the sleeve with its apex pointing downstream of the air flow, that is, in the direction of the conditioning unit. The base of the cone is preferably placed a short distance beyond the downstream end of the sleeve. This placement of the cone with respect to its base is necessary in order to forestall frosting or icing-up of the apparatus at the throat of the apparatus, i.e. at the most constricted part of the sleeve. The base of the cone is preferentially dished out, presenting a concave surface, and a cover is provided which encloses the base of the cone, thereby furnishing a small air chamber. The cover has a centrally placed opening for receiving the conduit carrying the moisture-laden air. There is a circumferential opening between the cover and the dished out base of the cone, which permits the escape of the moisture-laden air from the previously mentioned small air chamber into the cooled air stream of the return duct.

An embodiment of the apparatus of the present invention is illustrated in the accompanying drawings.

FIGURE 1 is a schematic view of the system of the invention;

FIGURE 2 is a cross section of the arrangement for intimately mixing the introduced moisture-laden air with the cooled air; and FIGURE 3 is a side elevation view, partly in cross-section, of an apparatus suitable for saturating air.

The system of FIGURE 1 has a refrigerated chamber 10 which is connected through an air discharge duct 11 to a conventional unit cooler 12. The unit cooler may be one of those illustrated and described in the Refrigeration Data Book, 2nd Ed. 1946, at pages 230–234, published by the American Society of Refrigerating Engineers. The atmosphere of the chamber is continuously removed to the unit cooler, where its heat content is adjusted to a value which will maintain the temperature of the refrigerated chamber at a predetermined value. The cooled stream of air from the unit cooler is returned to the refrigerated chamber through an air return duct 14.

A second stream of air is introduced into the cooled air from the unit cooler at a point along the air return duct 14 and prior to the introduction of the refrigerated air to the chamber. Means are provided for regulating the moisture content of this second air stream as a function of the relative humidity of the chamber with the aim of providing a moisture load in the second air stream of a magnitude sufficient upon mixing with the cooled air from the unit cooler to give the desired relative humidity within the refrigerated chamber. It is necessary that the second air stream be intimately mixed with the cooled air carried by duct 14 to have a uniform mixture of air and moisture. This is accomplished in the system of FIGURE 1 by a mixing means 15. This mixing means is made up of a cylindrical sleeve 17 (see FIGURE 2) which is open at both of its ends. The sleeve has a smaller cross-section than the air return duct 14 in which it is placed. There is a cone 18 mounted within the sleeve by several brackets 19 with the apex of the cone extending upstream of the air flow of the return duct and its base 20 a short distance beyond the downstream end of the sleeve. The base is dished out to present a concave surface. A cover 22 encloses the concave base, and together with the base defines a small air chamber. In the embodiment illustrated in FIGURE 2 there is a ring spacer 23 of short length held between the dished out cone base and its cover 22. The ring has a plurality of radial passageways or openings around its circumference. A slit in the ring may be employed in the place of the several radial openings. As illustrated in FIGURE 2, the cover and the ring spacer are fastened to the cone by several screws 24. The cover, which is a truncated cone, has an opening at its small base for receiving an air conduit 26. This air conduit leads the aforementioned second air stream (the moisture laden air) into the air chamber at the cone's base. The air escapes from this small air chamber through the radial passageways of the ring spacer into the refrigerated air which is being returned through the duct 14 to the refrigerated space. It has been the applicant's experience that the base of the cone should be placed a short distance beyond the downstream end of the sleeve, otherwise there may occur a frosting or icing condition within the sleeve which in time will impede the flow of air through the sleeve.

The air conduit 26 carries a saturated air under pressure from an air saturator 28 to an electrical heater 29 where the air is warmed (a 10° F. increase in temperature is ample) to forestall condensation of moisture from the saturated air before the air is mixed with the refrigerated air. Air out of the heater will not be so saturated. From the electrical heater, conduit 26 extends to the previously described mixing means. The electrical heater is preferably placed immediately adjacent the outlet of the air saturator as this location will prevent any appreciable condensation of moisture from the air carried by conduit 26.

The air saturator 28 is an upright hollow cylindrical vessel provided with both a conical top 30 and a conical bottom 31. There is centrally disposed within the air saturator, intermediate of its length a downwardly directed steam nozzle 33 which is connected to a source of steam through a steam pipe 34, which has along its length a steam valve 35. The steam is continuously added to the air passing through the air saturating unit in an amount at all times sufficient to assure saturation. The principal purpose of the valve and the control means regulating it is to provide means for varying the amount of steam introduced and thereby to vary the temperature of the saturated air. Since saturated air streams of varying temperature will carry different loads of moisture, it is possible by regulation of the temperature of the air within the air saturator to accordingly regulate the amount of moisture introduced to the refrigerated air of the air return duct 14. An air line 37 opens into the base of the air saturator. Air is supplied through this air line to the system by an air blower 38. The air under pressure rises through the air saturator into contact with the steam introduced by the nozzle and from that point passes upwardly through a filter 40 to the space defined by the conical top where it is conveyed by the air conduit 26 to the heater and hence to the air mixing means in duct 14. The air saturator has a discharge pipe 41 at its base for carrying away the condensed steam through a suitable trap.

A temperature sensing instrument 43 is electrically connected to a temperature controller 44 and the controller in turn is coupled to the unit cooler. The temperature controller may be set to a desired temperature and if there should be a variance in the temperature setting and the actual temperature of the refrigerated space as registered on the sensing instrument, a signal is sent from the controller to the unit cooler to make the necessary adjustment in refrigeration.

The humidity is regulated with the assistance of a humidity sensing instrument 46 and a humidity controller 47, which may be electrically linked together. The humidity controller is coupled to the steam valve 35 and regulates the opening and closing of the valve. The controller may be set to any desired relative humidity within its range. In operation, if there should be a variance in the recording of the humidity sensing instrument and the setting of the controller, the controller will cause the valve to be moved in the appropriate direction to remedy the variance. For example, if there should be a drop in the relative humidity recorded by the sensing instrument below the setting of the controller, the controller will move the valve toward its open position, thus permitting more steam to enter the air saturator and thereby raise the temperature of the air passing therethrough. Since the air exiting from a saturating unit is always saturated it follows that the air stream having a higher temperature will carry a larger moisture load than theretofore. This will result in an increase in the relative humidity of the conditioned air of the atmosphere within the refrigerated chamber. If there is no difference between the setting of the humidity controller and the recording of the humidity sensing instrument, the steam valve is undisturbed.

In one typical air conditioning system of the type described, primary air in the amount of 1000 c.f.m. cooled to 25.5° F. exits from the conditioning unit 12. Secondary air from the air saturator 28, in the amount of about 24 c.f.m. at a temperature of 155° F., is intimately mixed with the primary air. The mixed air stream will have a temperature in the neighborhood of 29° F. The average temperature of the refrigerated space may be readily maintained at about 32° F. and with a relative humidity of 98 percent.

Obviously many modifications and variations of the invention as hereinbefore set forth may be made without departing from the spirit and scope thereof, and therefore only such limitations should be imposed as are indicated in the appended claims.

I claim:

1. In an air conditioning system for a refrigerated chamber for foodstuffs, the combination comprising a cooling unit, a first duct for removing air from the chamber to the unit, a second duct for returning cooled air from the unit to the chamber, a conduit disposed to enter a portion of said second duct, means to force a stream of air through said conduit into said second duct, a source of steam adjacent to said conduit, means for injecting steam into the stream of air in said conduit whereby the moisture content of said stream may be regulated as a function of the relative humidity of the chamber, means for intimately mixing said stream of air with the cooled air, said means comprising a sleeve having smaller cross-section than said second duct disposed within a portion of said second duct adjacent to said chamber and a small air chamber one end of which is disposed within said sleeve, said air chamber being connected to said conduit and having an opening to permit the escape of said stream of air, and means for regulating the degree of cooling of the air within the cooling unit as a function of the temperature of the refrigerated chamber.

2. In an air conditioning system for a refrigerated chamber for foodstuffs the combination comprising a cooling unit for reducing air temperature, a first air duct for removing air from the chamber to the unit, a second air duct for returning cooled air from the unit to the chamber, means for reducing the temperature of the air within the conditioning unit as a function of the temperature of the chamber, means for providing a second separate stream of air having an adjusted moisture load for introduction into the second air duct, said latter means including a vessel, an air line opening into said vessel spaced from said steam line, an air blower connected in said air line for delivering said second stream of air into said vessel, a valve in the steam line for regulating the amount of steam flowing through said line, means for regulating the position of said steam valve as a function of the relative humidity of the chamber to provide a moisture load in second air stream of a magnitude sufficient upon mixing with said conditioned air to give the predetermined relative humidity within the chamber, a conduit leading from said vessel to the second duct, and means for intimately mixing said second air stream with the conditioned air, said mixing means comprising a cylindrical sleeve having a smaller cross-section than said second duct disposed within said second duct, a cone placed within said sleeve with its apex pointing upstream and its base a short distance beyond the downstream end of the sleeve, a cover enclosing the base with an opening to receive the conduit, said cover together with the base defining a small air chamber, and an opening for permitting the escape of the second stream of air from the small air chamber.

3. In an air conditioning apparatus of the type described in claim 2 wherein there is provided a heater associated with the conduit leading from the vessel to the second air duct for raising the temperature of the second air stream.

4. In an air conditioning system for a chamber, the combination comprising a cooling unit, a first duct for removing air from the chamber to the unit, a second duct for returning cooled air from the unit to the chamber, an air saturator, means for injecting steam into said saturator, a conduit for carrying a stream of saturated air from said air saturator to said second duct, and means for intimately mixing said stream of saturated air with the cooled air, said means comprising a cylindrical sleeve of smaller cross-section than said second duct disposable within said second duct, a cone placed within said sleeve with its apex adjacent to the upstream end of said sleeve and its base a short distance beyond the downstream end of the sleeve, said cone having a dished out base, a cover for enclosing the dished out base of the cone with an opening to receive the conduit, said cover together with the dished out base defining a small air chamber, and an opening to permit the escape of said stream of saturated air from said air chamber into the cooled air.

References Cited in the file of this patent

UNITED STATES PATENTS

| | | |
|---|---|---|
| 1,540,322 | Folsom | June 2, 1925 |
| 1,909,164 | Bulkeley | May 16, 1933 |
| 2,093,834 | Gaugler | Sept. 21, 1937 |
| 2,244,634 | Sisson | June 3, 1941 |
| 2,245,464 | Coey | June 10, 1941 |
| 2,254,185 | Newton | Aug. 26, 1941 |
| 2,290,465 | Crawford | July 21, 1942 |
| 2,338,382 | Marlow | Jan. 4, 1944 |
| 2,585,205 | Young | Feb. 12, 1952 |
| 2,661,195 | Van Bemmel et al. | Dec. 1, 1953 |
| 2,738,961 | Mathers | Mar. 20, 1956 |
| 2,755,072 | Kreuttner | July 17, 1956 |

FOREIGN PATENTS

| | | |
|---|---|---|
| 419,829 | France | Nov. 5, 1910 |